United States Patent [19]

Hildebrand et al.

[11] Patent Number: 5,287,219
[45] Date of Patent: Feb. 15, 1994

[54] MICROSCOPE FOR TWO OR MORE OPERATORS

[75] Inventors: Klaus Hildebrand; Klaus-Peter Zimmer, both of Heerbrugg; Heinz Suhner, Rebstein; Juergen Metz, Balgach; Luitpold Schulz, Widnau, all of Switzerland

[73] Assignee: Leica Heerbrugg AG, Heerbrugg, Switzerland

[21] Appl. No.: 688,090

[22] Filed: Apr. 22, 1991

[30] Foreign Application Priority Data

Apr. 20, 1990 [DE] Fed. Rep. of Germany ....... 4012552

[51] Int. Cl.$^5$ .............................................. G02B 21/22
[52] U.S. Cl. ..................................... 359/368; 359/377; 359/380; 359/432
[58] Field of Search ...................... 359/368-390, 359/462-467, 819, 825, 827, 831, 833-837, 659, 678

[56] References Cited

U.S. PATENT DOCUMENTS

| | | | |
|---|---|---|---|
| 2,780,141 | 2/1957 | Luboshez | 359/678 |
| 3,186,300 | 6/1965 | Littmann | 359/376 |
| 3,751,138 | 8/1973 | Humphrey | 359/669 |
| 4,138,191 | 2/1979 | Peyman et al. | 359/363 |
| 4,341,435 | 7/1982 | Lang et al. | 359/376 |
| 4,448,498 | 5/1984 | Muller et al. | 359/377 |
| 4,518,231 | 5/1985 | Muchel et al. | 359/377 |
| 4,525,042 | 6/1985 | Muchel | 359/380 |
| 4,601,550 | 7/1986 | Yoshino et al. | 359/377 |
| 4,605,287 | 8/1986 | Lang et al. | 359/374 |
| 4,640,588 | 2/1987 | Tanaka | 359/377 |
| 4,657,356 | 4/1987 | Matsumura | 359/377 |
| 4,688,907 | 8/1987 | Kleinberg | 359/377 |
| 4,702,570 | 10/1987 | Yoshino et al. | 359/377 |

FOREIGN PATENT DOCUMENTS

| | | | |
|---|---|---|---|
| 3212691 | 10/1983 | Fed. Rep. of Germany | 359/377 |
| 907679 | 10/1962 | United Kingdom | 359/377 |

Primary Examiner—Bruce Y. Arnold
Assistant Examiner—Thong Nguyen
Attorney, Agent, or Firm—Foley & Lardner

[57] ABSTRACT

A microscope adapted for use by two or more operators during surgical operations has a main objective lens and at least two mutually independent stereoscopic observation beam paths. Each stereoscopic observation beam path has a magnification system and a focusing system disposed therein. Pupil displacement systems are provided in modular construction of different mechanical lengths but of equal optical path lengths. This modular construction allows individual and customized configurations of the microscope for adaptation to meet the needs and requirements of various operating conditions and the various operating disciplines.

44 Claims, 7 Drawing Sheets

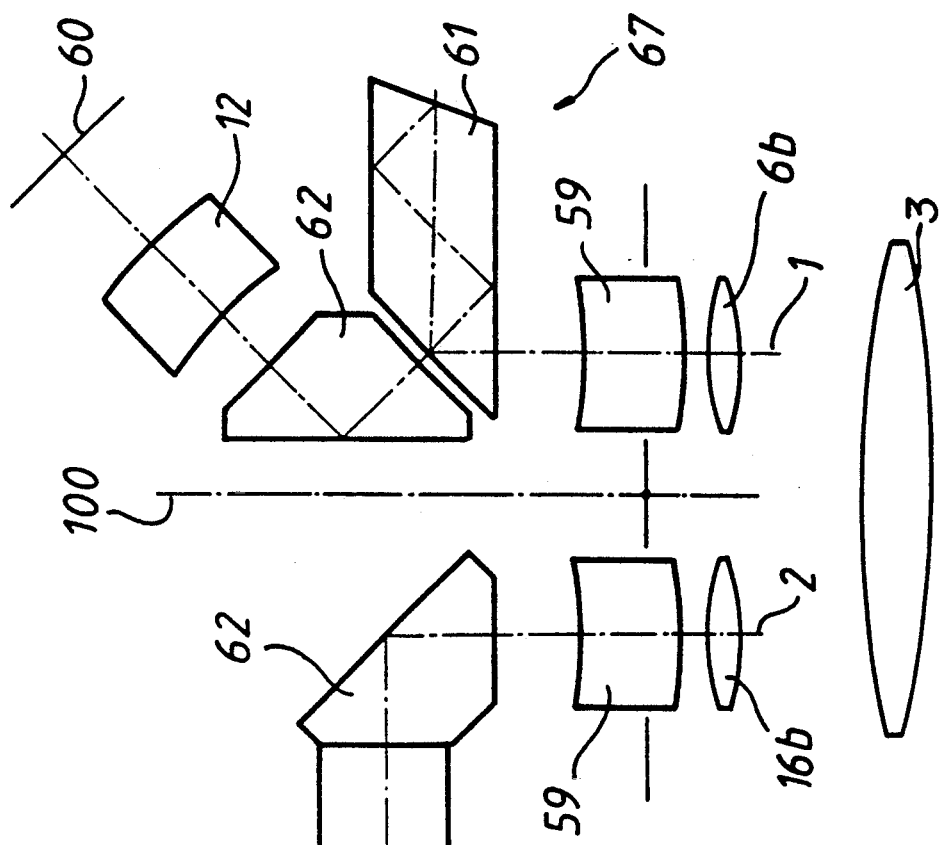
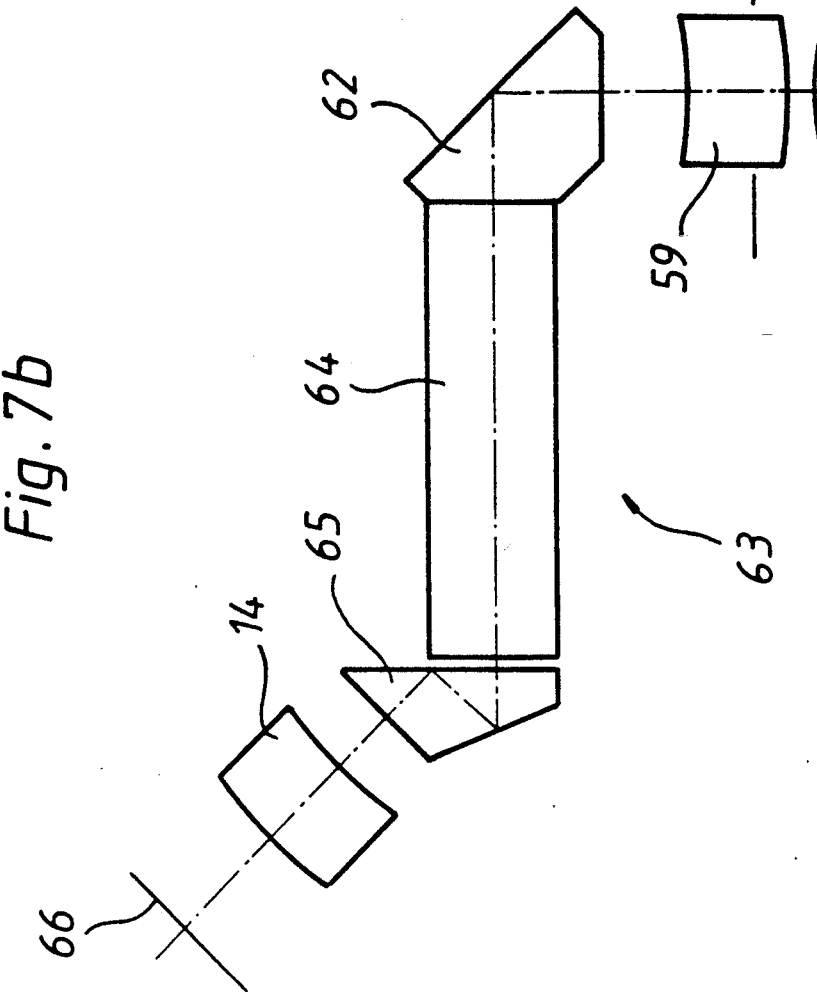

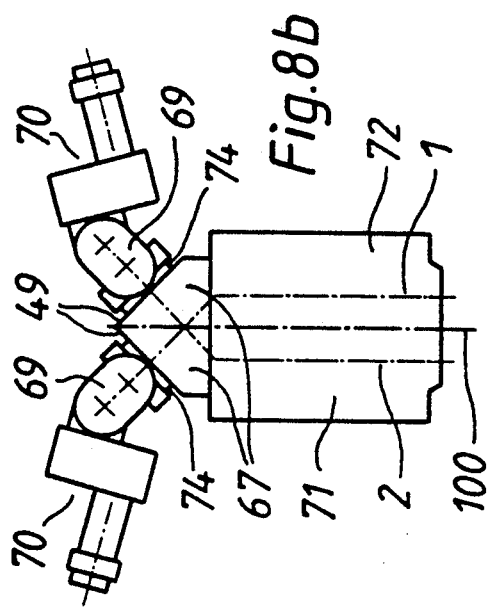
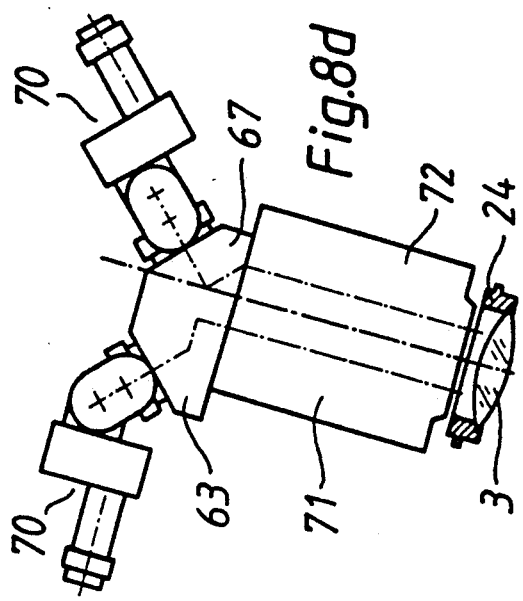
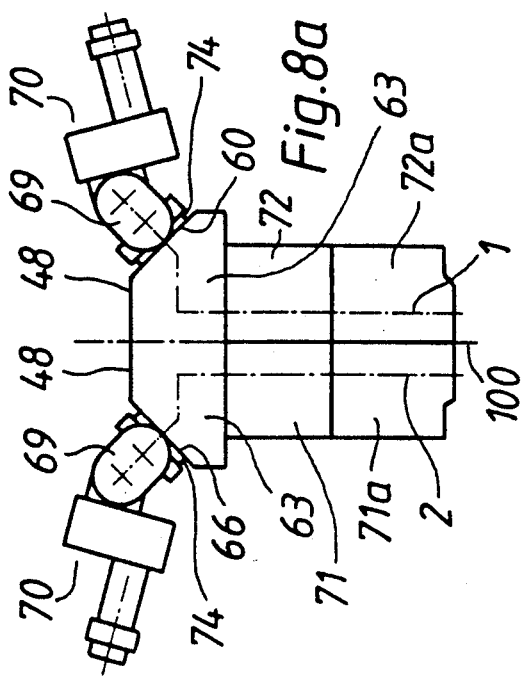
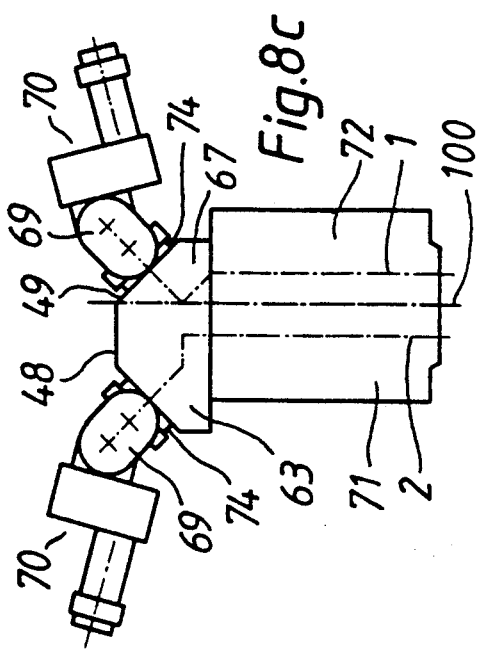

MICROSCOPE FOR TWO OR MORE OPERATORS

BACKGROUND OF THE INVENTION

1. Field of the Invention

The present invention relates generally to a microscope and more specifically relates to a microscope adapted for use by two or more operators during surgical operations and having a main objective and downstream optical systems for changing the level of magnification and for adjusting the plane of focus.

2. Description of the Prior Art

Microscopes are used, for example, in microsurgical operations within the clinical sector. As a result of progressively more complex surgical operating methods, it is often necessary for more than one operator to be able to work simultaneously at a surgical operating site. Moreover, in the various surgical operating disciplines, it is also often necessary for surgical operators to individually arrange their working posture and position in working relation to the subject patient.

A surgical operating microscope for two surgeons is disclosed, for example in DE 2,949,429. This patent discloses a surgical operating microscope having a main objective and three separately executed observation beam paths downstream of the main objective for two observation tubes. In order to construct two stereoscopic observation beam paths, one of the three beam paths is used jointly. As a result, it is not possible to independently adjust the image magnification of one stereoscope observation beam path without simultaneously adjusting the image magnification of the other stereoscopic observation beam path.

DE 3,333,471 discloses a surgical operating microscope wherein the observation beam paths are capable of individual settings. This is accomplished by two separate microscopes that are disposed at a right angle relative to each other with each microscope exhibiting an objective, a magnification changing device and a binocular tube. By means of a mirror that is partially transparent and disposed at 45°, the light coming from the object is directed via the two objectives into the respective separate observation beam paths. Accordingly, while advantageous from the perspective of independent magnification control, this construct nevertheless suffers from a particular disadvantage stemming from the use of a partially transparent mirror that reduces the light available for observation by 50%.

DE 3,602,095 and DE 3,523,639 also disclose operating microscopes for use by two surgical operators. In both microscopes, there is a common main objective and observation beam paths that are executed separately from one another. In order to permit both operators to have the same view of the object field to be investigated, irrespective of the particular location, one of the stereoscopic beam paths is rotated about the optical axis of the main objective using additional optical means. Both stereoscopic beam paths exhibit zoom objectives to alter the image magnification. In addition to the considerable mechanical complexity, these microscopes suffer from a further disadvantage in that it is not possible to carry out independent focusing of the individual observation beam paths.

U.S. Pat. No. 4,138,191 discloses a surgical operating microscope for use by two operators, in which two separate stereoscope observation beam paths are formed using a common main objective. This reference also discloses the possibility of using an additional separate beam path for making photographic exposures. This microscope, however, also suffers from the disadvantage of lacking the capability of independently focusing the two stereoscopic observation beam paths.

DE 3,202,075 discloses an optical system with variable intercept length and focal length for surgical operating microscopes with a main objective of fixed focal length. The internal focusing provided in this microscope includes a zoom system with a plurality of lens groups that is capable of movement along the optical axis of the main objective in order to retain the stereoscopic observation image in the course of focusing and in the course of the changing of the image magnification with concurrent movement perpendicular to the optical axis of the main objective. The curved movement resulting from this gives rise to a high degree of mechanical complexity in the precise guiding and coupling of the lens elements.

SUMMARY OF THE INVENTION

Accordingly, it is an object of the present invention to provide a microscope that can be used simultaneously by at least two operators in a manner such that in any given object field at least one operator can adjust his or her own individual level of magnification and plane of focus independently of and without affecting the other operator's level of magnification and plane of focus.

It is a further object of the present invention to provide a surgical operating microscope adapted for use by two or more operators such that within an object field that is to a large extent the same, each operator can set an individual magnification and an individual plane of focus.

The present invention is directed to a novel microscope for use by two or more operators and represents a vast improvement and a completely novel approach for satisfying and meeting the needs, requirements and criteria for effective and useful microscopic viewing without the problems and disadvantages of the prior art methods in a safe and cost effective manner and without complex and complicated construction.

A particular advantage of the present invention is realized and achieved due to the fact that by use of the microscope of the present invention in differing operating disciplines, each operator can independently adjust their own working posture as well as their working distance from the operating site or from the object according to their own particular needs and requirements.

Additional objects and advantages of the present invention will be set forth, in part, in the description that follows and, in part, will be obvious from the description or may be learned by practice of the invention. The objects and advantages of the invention may be learned by and attained by means of the instrumentalities, combinations and configurations particularly pointed out in the appending claims. Additionally, the teachings of the patents previously noted above are incorporated herein by reference.

To achieve the foregoing objects and in accordance with the purpose of the present invention, as embodied and broadly described herein, the microscope of the present invention comprises a main objective lens having an optical axis; at least two mutually independent stereoscopic observation beam paths; a lens system disposed in each stereoscopic observation beam path in parallel with the optical axis of the main objective lens;

the lens system having magnification means for selecting a magnification level; the magnification means including a first pair of lenses disposed below a second pair of lenses in overlapping configuration; at least one of the lens systems having focusing means for adjusting a focus plane of an object image; the focusing means including a first pair of overlapping, rotatable wedges disposed between a first lens of the first pair of lenses and the main objective lens and a second pair of overlapping, rotatable wedges disposed between a second lens of the first pair of lenses and the main objective lens.

In an alternate embodiment of the present invention, the focusing means includes a first pair of overlapping, rotatable wedges disposed between a first lens of the first pair of lenses and a first lens of the second pair of lenses and a second pair of overlapping, rotatable wedges disposed between a second lens of the first pair of lenses and a second lens of the second pair of lenses.

The first pair and/or second pair of lenses of the magnification means may be movably and adjustably disposed above the main objective lens in overlapping manner.

There may further be provided a pupil displacement system within one or more stereoscopic observation beam path above the lens system. Each pupil displacement system may be provided in modular unit construction so as to be easily and quickly interchangeable. Each pupil displacement system may be provided in varying and different lengths, and the variance in such length may be equalized using prisms so that the effective optical path length of each pupil displacement system is uniform and equal.

The focusing means may further comprise a pair of lower and upper rotatable mounts for each pair of overlapping rotatable wedges; the upper rotatable mount having a wavy profile top rim; the lower rotatable mount and the upper rotatable mount being operatively engaged by a bevel gear for rotation in mutually opposite directions; the bevel gear being operatively associated with a rotary drive shaft; a mount movable along and in parallel with the optical axis of the main objective lens and disposed above the upper rotatable mount and holding a first lens of the first lens system; and a control element integral with the mount holding the first lens and operatively associated with the top rim of the upper rotatable mount, wherein the mount holding the first lens is operatively moved by rotation of said upper rotatable mount, and the upper rotatable mount is operatively rotated by rotation of the rotary drive shaft.

Each rotary drive shaft may be operatively associated with a drive gear wheel, and each drive gear wheel may be associated with a common drive gear wheel. The common drive gear wheel may be operatively associated with a driver, e.g., a motor.

Overall, the microscope of the present invention allows at least two operators to simultaneously use the microscope and comprises a main objective having an optical axis and a fixed focal length for all beam paths, and at least two mutually independent stereoscopic optical beam paths extending parallel with the optical axis of the main objective, wherein at least one of the stereoscopic optical beam paths may be focused independently of the other stereoscopic optical beam path. In operation, the microscope may be initially focused for stereoscopic viewing by adjusting by displacement of the entire microscope apparatus along the optical axis 100 of the main objective relative to the object image in order to focus one of the stereoscopic beam paths with the other stereoscopic beam path being focused for stereoscopic viewing of the desired focal plane using the focusing means.

The use of rotating optical wedges in the stereoscopic observation beam paths ensures the alignment of any convergent or divergent beams parallel to the optical axis of the respective stereoscopic observation beam path, thereby ensuring that the stereoscopic viewing is not compromised.

There may be a plurality of stereoscopic observation beam paths provided around the optical axis of the main objective lens. One or more or all of these paths may be provided with lens systems that allows individual focusing of the desired focal plane of the object image. Moreover, one or more or all of these paths may be provided with lens systems that allow individual magnification of the desired object image.

Additionally, with the use of pupil displacement systems that may be provided in modular unit form for quick and easy interchangeability, the distance of the operator relative to the object image may be suitably made to meet the needs and requirements of the operator.

It is to be understood that both the foregoing general description and the following detailed description are exemplary and explanatory only and are not restrictive of the invention as claimed.

The accompanying drawings, that are incorporated in and constitute a part of this specification, illustrate an embodiment of the present invention and together with the description, serve to explain the principles of the invention.

BRIEF DESCRIPTION OF THE DRAWINGS

FIG. 7a is a schematic, diagrammatic view showing one embodiment of a pupil displacement system of the present microscope;

FIG. 7b is a schematic, diagrammatic view showing another embodiment of a pupil displacement system of the present microscope;

FIG. 8a is a schematic, diagrammatic view showing an embodiment of a pupil displacement system in combination with the microscope of the present invention;

FIG. 8b is a schematic, diagrammatic view showing another, second embodiment of a pupil displacement system in combination with the microscope of the present invention;

FIG. 8c is a schematic, diagrammatic view showing another, third embodiment of a pupil displacement system in combination with the microscope of the present invention; and FIG. 8d is a schematic, diagrammatic view showing another, fourth embodiment of a pupil displacement system in combination with the microscope of the present invention.

DETAILED DESCRIPTION OF THE PREFERRED EMBODIMENTS

Reference will now be made, in detail, to a preferred embodiment of the present invention, an example of which is illustrated in the accompanying drawings. Whenever possible, the same reference numbers will be used throughout the drawings to refer to the same or like parts.

Figure 1:
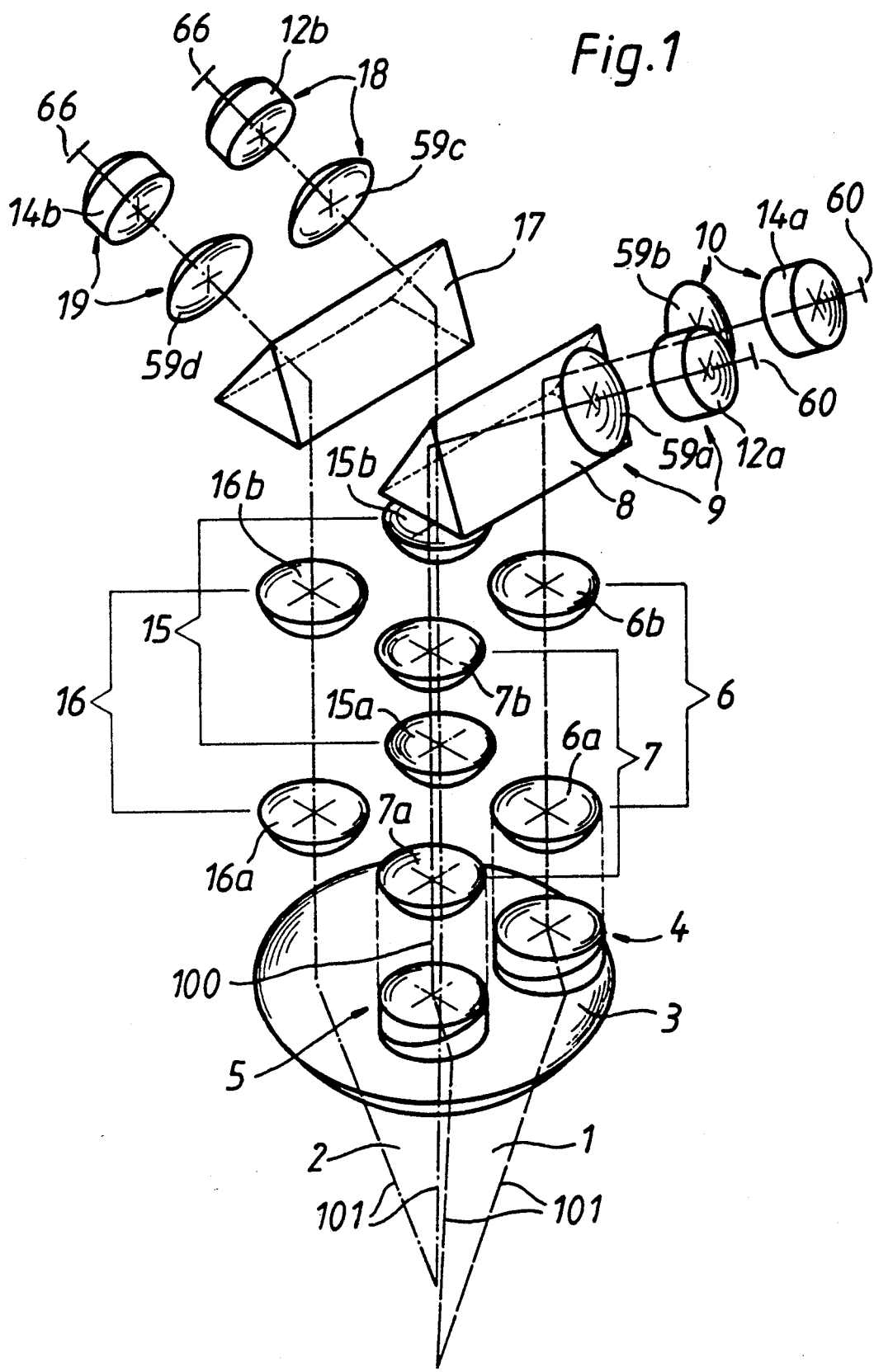
FIG. 1 is a relational, diagrammatic view illustrating an arrangement of two separate stereoscopic observation beam paths in a preferred embodiment of the microscope of the present invention.

Referring to FIG. 1 and in accordance with the invention, it may be seen that there is provided two separately executed stereoscopic observation beam paths 1, 2 in an operating microscope (not shown). A common, stationary main objective lens 3 is removably and exchangeably disposed in the observation beam paths 1 and 2. Proceeding in observation beam path 1 from objective lens 3, two pairs of rotating wedges 4, 5 are provided in the stereoscopic beam path 1. In each instance, a lens system 6, 7 with individual lens groups 6a, 6b; 7a, 7b is disposed downstream of the pairs of rotating wedges 4, 5, respectively. In conjunction with the pairs of rotating wedges 4, 5 the lens groups 6a, 7a permit an alteration of the intercept length or focal plane of the main objective lens 3, and in conjunction with the downstream lens groups 6b, 7b, are employed as magnification means, i.e., they permit an alteration or changing of the level of magnification of the object image.

For deflection of beam path 1 into binocular tubes (not shown), a common deflecting prism 8 is provided. A further pair of lens system 59a, 12a; 59b, 14a that form individual telescopes 9, 10 are provided for the lens systems 6, 7, respectively. The plane represented by reference number 60 marks the tube bearing surface.

In a similar manner to stereoscopic observation beam path 1, a second observation beam path 2 extends through main objective lens 3 partially in parallel with observation beam path 1 and then through a pair of lens systems 15, 16 with individual lens groups 15a, 15b; 16a, 16b. These lens systems 15, 16 are employed as magnification means, i.e., to alter the image magnification in observation beam path 2. Beam paths 1 and 2 extend entirely separately and independently of each other and are disposed symmetrically about the optical axis 100 of the main objective 3. Accordingly, it is to be understood that in FIG. 1, it is solely for reasons of representation in a drawing that these beam paths 1, 2 appear superimposed in the region of the lens systems 7 and 15.

In a manner similar to beam path 1, a deflecting prism 17 as well as a further pair of lens system 59c, 12b; 59d, 14b that form individual telescopes 18, 19, respectively, are provided in the stereoscopic beam path 2 for beam deflection into binocular tubes (not shown). In this case, the plane of the tube bearing surface is identified by reference symbol 66.

For the sake of clarity, it is to be understood that the two pairs of lens systems 59a, 59b; 59c, 59d shown in FIG. 1 are between the two prisms 8, 17 and the lens systems 12a, 14a; 12b, 14b, respectively. In FIGS. 7a and 7b, the deflecting prisms 8, 17 of FIG. 1 are represented by an altered arrangement of prism systems as shown and will be described.

Figure 2:
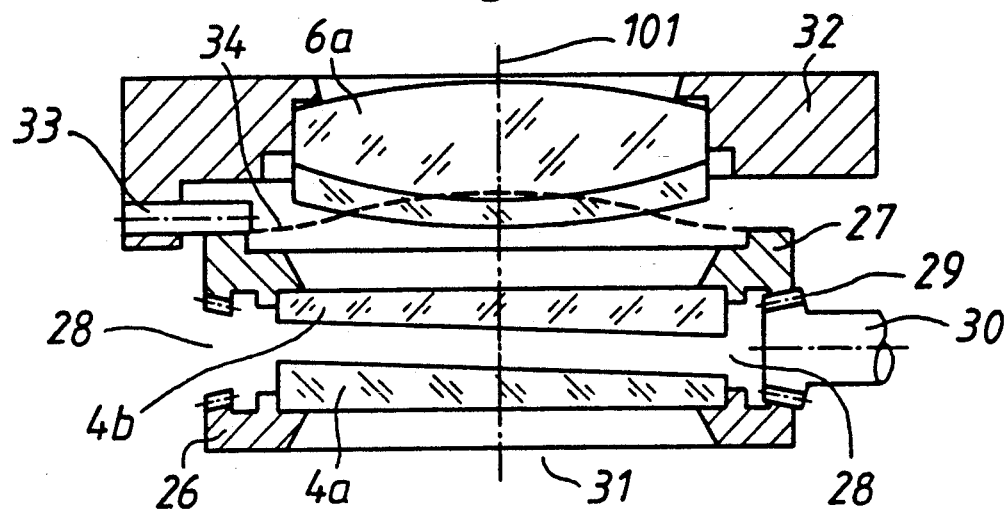
FIG. 2 is a cross-sectional, schematic diagram illustrating the internal focusing arrangement of the microscope of the present invention.

Referring now to FIG. 2, focusing means is shown for focusing the pair of individual optical wedges 4a and 4b disposed one above the other, i.e., overlapping configuration, as well as the lens 6a. The wedges 4a, 4b are seated in separately rotatable cylindrical mounts 26, 27, respectively, with a circulating conical toothing arrangement 28 formed between mounts 26, 27. Operatively engaging the conical toothing arrangement 28 is a bevel gear 29 that is connected to a rotary drive shaft 30. Rotary movement of drive shaft 30 imparts rotary movement to bevel gear 29 and is transmitted to cylindrical mounts 26 and 27, and cylindrical mounts 26 and 27 are moved in mutually opposite directions about optical axis 101.

Lens 6a shown in FIG. 2 is seated in a mount 32 that is designed to be movable along axis 101. Control element 33 is fixedly disposed on mount 32 and is supported on mount rim 34 of rotatable cylindrical mount 27.

Figure 3:
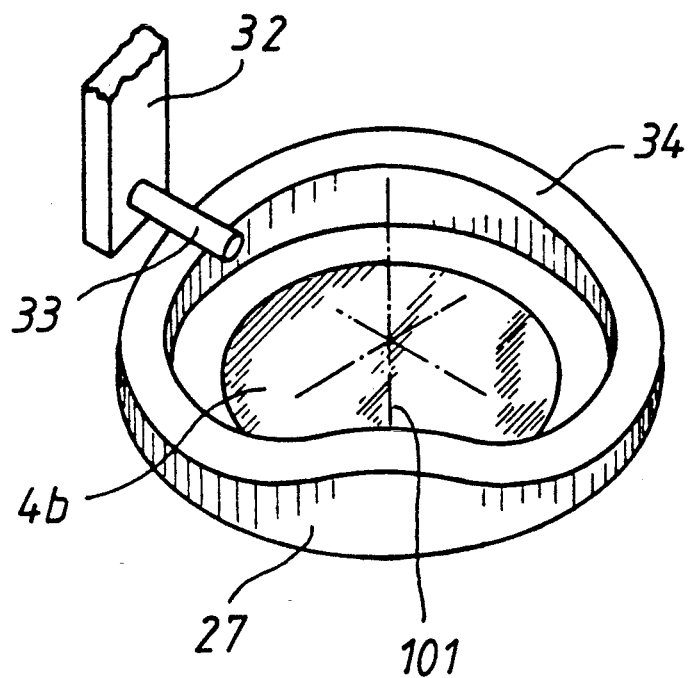
FIG. 3 is a perspective view of a mount for the pair of rotating wedges including a control element.

The mount rim 34 is shown in greater detail in FIG. 3 and exhibits a wavy profile. The mount rim 34 exhibits two profile maxima and two profile minima with each maxima situated opposite the other maxima and each minima situated opposite the other minima. Control element 33 is operatively associated with mount rim 34, so that a rotary movement of cylindrical mount 27 effects a linear movement of lens system mount 32 along axis 101 over a distance equal to the difference in profile height between the profile maxima and profile minima of mount rim 34.

Figure 4:
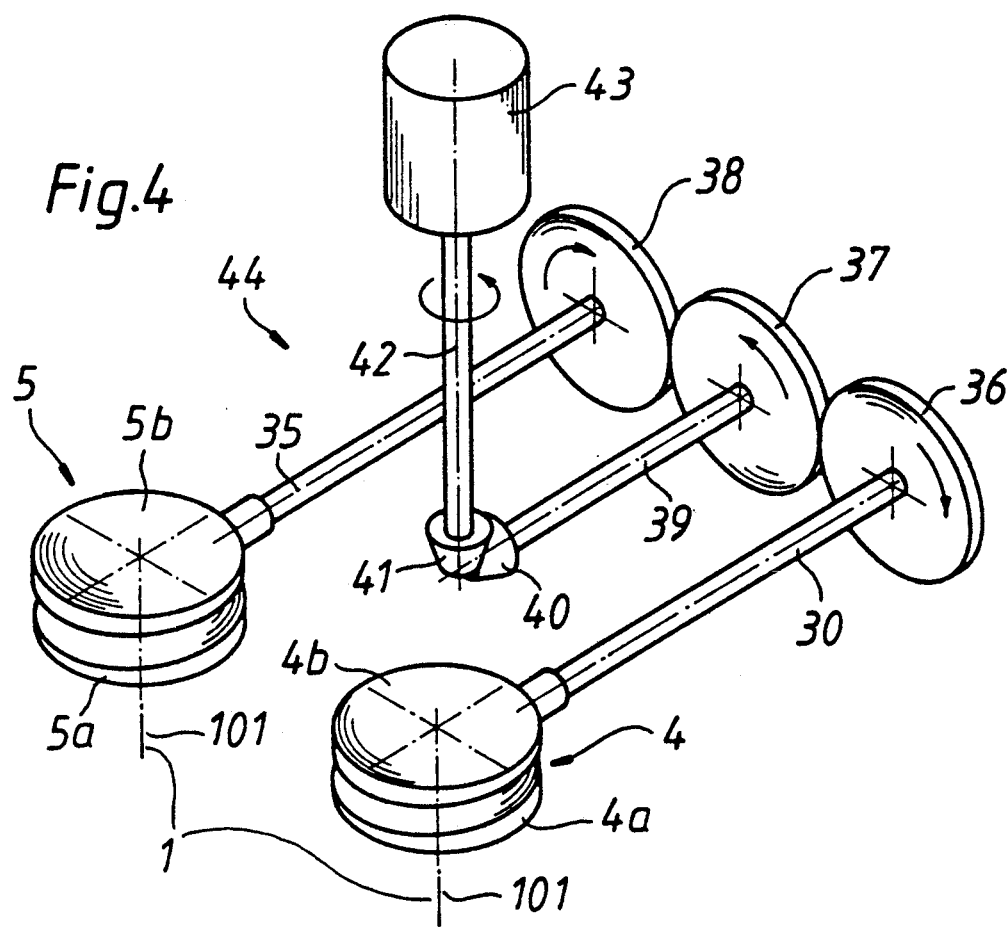
FIG. 4 is a relational, diagrammatic view illustrating a synchronously operating mechanical coupling for the pairs of rotating wedges as disposed in a stereoscopic observation beam path of the present microscope.
Figure 2A:
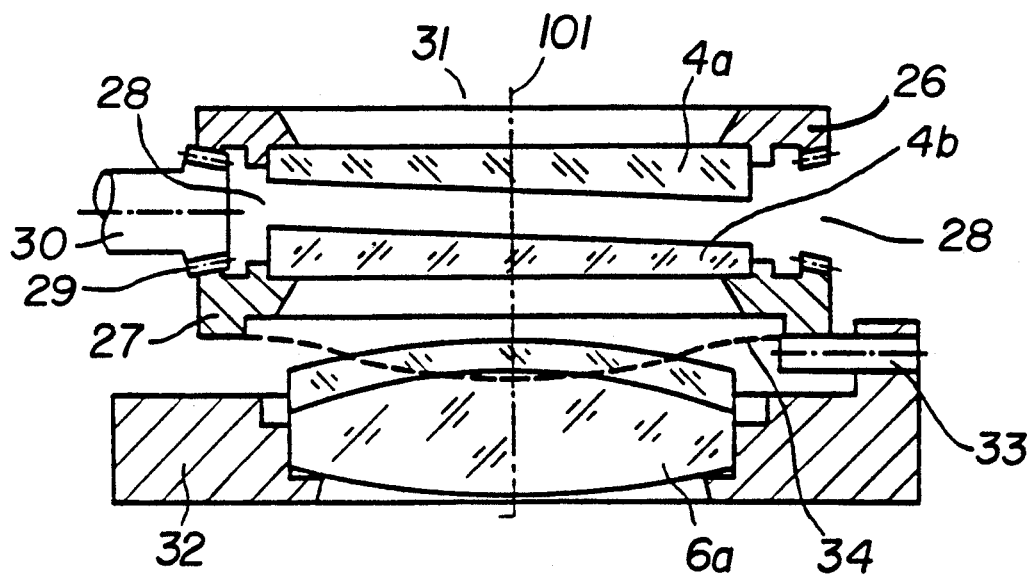
FIG. 2A is a cross-sectional, schematic diagram illustrating the internal focusing arrangement of a microscope according to an alternate embodiment of the present invention, wherein a rotating wedge pair is shown between a first and second group of lenses.

FIG. 4 shows a synchronously operating mechanical coupling for two pairs of rotating wedges 4 and 5, disposed in stereoscopic observation beam path 1, using a common drive unit 44. As has already been stated with reference to FIG. 2, the pairs of optical wedges 4, 5 are designed to be rotatable by means of bevel gears 29 in the observation beam path. The two bevel gears for the pairs of optical wedges 4, 5 are connected to drive shafts 30 and 35, respectively. Each drive shaft 30, 35 is connected to a corresponding gear wheel 36 and 38, respectively, which are in turn connected to a common drive gear wheel 37. The common drive gear wheel 37 is operatively associated with a driver 43 via a drive coupling having a shaft 39, additional bevel gears 40 and 41 and a further shaft 42 such that rotary movement of driver 43 is synchronously transmitted to the two pairs of rotating wedges 4 and 5. The direction of motor rotation and the individual rotational direction of gear wheels 36, 37, 38 resulting therefrom are shown by arrows in FIG. 4.

Figure 5:
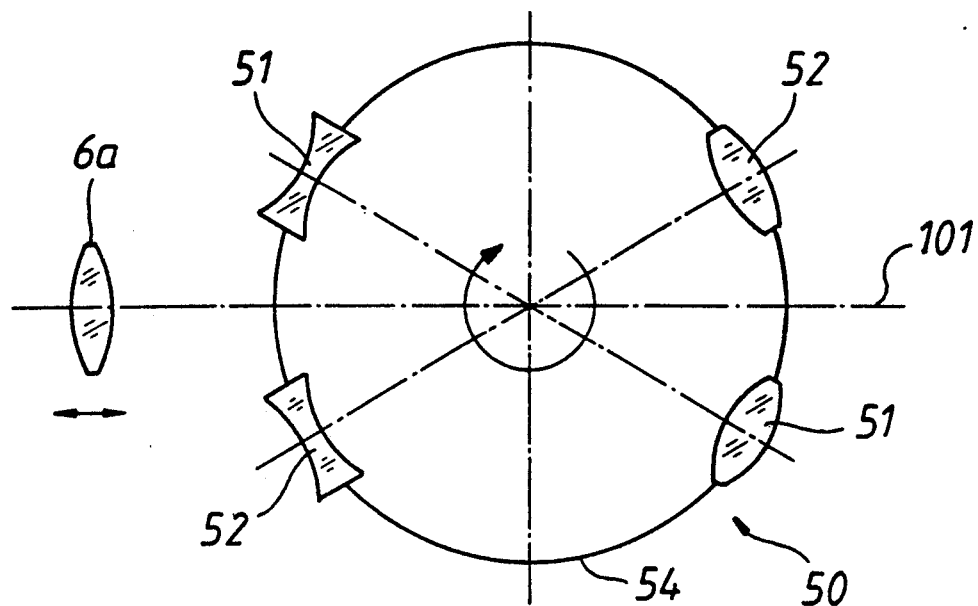
FIG. 5 is a relational, diagrammatic view illustrating a stepped magnification changing device rotatably disposed in an observation beam path.

FIG. 5 shows a stepped magnification changing device 50, that may replace, for example, the lens systems 15 and 16 that are illustrated in FIG. 1. The changing device 50 exhibits fixedly associated lens combinations 51 and 52, that are disposed on a rotatable revolver 54 and can be rotated into the path of the optical axis 101. Such a changing device 50 can be provided pairwise in the observation beam path 2 so that differently defined and coordinated changes to the image magnification can be undertaken.

Figure 6A:
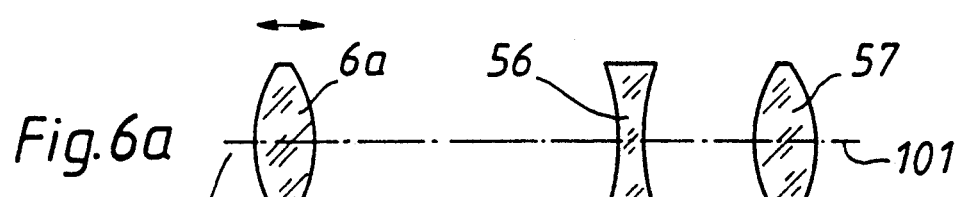
FIGS. 6a–6c are relational, diagrammatic views illustrating a continuously displaceable magnification unit.
Figure 6B:
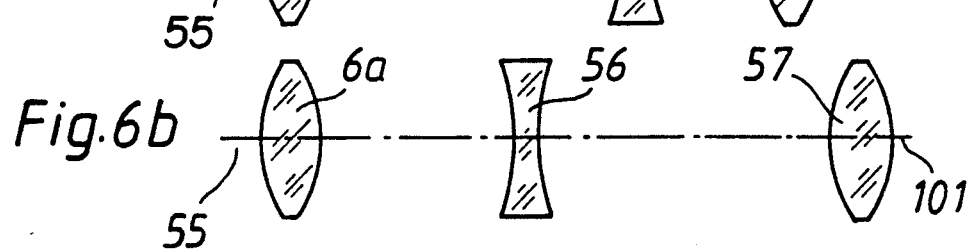
Figure 6C:
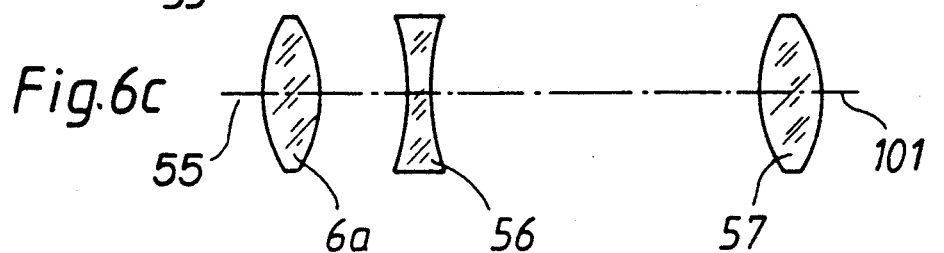

FIGS. 6a-6c show a continuously displaceable magnification changing device or unit 55, that is equipped with differing lens groups 56, 57 and that additionally supplements, for example, the lens systems 6, 7; 15, 16 of FIG. 1. As a result of a movement of the lens groups 56, 57 along the optical axis, the image magnification may be continuously displaced or altered even when using a stationary main objective lens 3.

FIGS. 7a and 7b show variants for the individual alteration of the working distance between the tube bearing surface 60, 66 and the optical axis 100 of the main objective 3.

In the observation beam path 1, proceeding from the lens group 6b (c.f., FIG. 1), FIG. 7a shows the lens 59, a pupil displacement system 67 of short overall length with a folding prism 61 with four reflections, a pentaprism 62 as well as the lens system 12.

In contrast to FIG. 7a, FIG. 7b shows a pupil displacement system 63 of greater overall length, in which the lens 59, the pentaprism 62, a plane-parallel plate 64 to extend the length, a Bauernfeind prism 65 and the lens system 14 are disposed in the observation beam path 2. Lenses 14 and 12 form the telescope 18, 19 and 9, 10, respectively, as shown in FIG. 1. The bearing surface for the binocular tube is designated by reference number 66.

In spite of their differing mechanical overall lengths, the pupil displacement systems 67 and 63 shown in FIGS. 7a and 7b, respectively, exhibit equal optical path lengths, so that the beam paths are not influenced by the differing mechanical overall lengths.

FIGS. 8a-8d show the various possible combinations of the pupil displacement systems 67, and 63 (c.f., FIGS. 7a -7b) for an operating microscope for two operators. The pupil displacement systems 67 and 63 are disposed in separate housings 48 and 49 for the individual alteration of the working distance between the tube 70 with the eye piece and the optical axis 100. The observation tubes 70 shown are set onto the surfaces 60, 66 by means of a respective rotary joint 74, and exhibit respective joints 69, by means of which the tube can be pivoted. The overall lengths of the housing 48 and 49 along the axis 100 are coordinated with one another. As a result of this, it is possible to achieve any selectable combinations of pupil displacement systems 67, 63 on a single operating microscope, and the differing operating disciplines can thus be implemented using an individually adapted microscope. Furthermore, the magnification systems and focusing systems may be disposed in separately exchangeable housings 71; 72; 71a; 72a, so that—as has already been stated in relation to the pupil displacement systems—individual changes in the configuration of the microscope can be effected.

In FIG. 8a, two pupil displacement systems 63 of long construction are combined with one another, while in FIG. 8b, two systems 67 of short construction are shown. The combination of a pupil displacement system 67 with a system 63 is shown in FIGS. 8c and 8d.

The main objective lens 3 is shown in FIG. 8d, with a bayonet mount 24 so that the objective lens can be easily and quickly replaced or switched with another lens.

Such operating microscopes are usually secured so as to pivot on a stand. The differing pupil displacement systems 67, 63 permit, in accordance with the example of FIG. 8d, an individual adaptation of the working distance when the microscope is tilted.

The mode of operation of the operating microscope for two operators with the possibility of being able to set differing object planes is explained in greater detail below. The entire microscope is secured on a stand (not shown) in a manner known per se and is focused by altering the distance between the main objective lens 3 and the object site. Referring to FIG. 1, the observation beam path 2 has been designed to be focused in accordance with this measure.

An object site image by main objective lens 3 may be seen stereoscopically only if the latter appears behind the lens system 6, 7 or 15, 16 at the same angle of view. In observation beam path 2, when using a focal magnification systems 15, 16, this is the case only for object points in the front focal plane of the main objective lens 3. In the observation beam path 2 an object site is not situated in the front focal plane of the main objective 3. The light beams proceeding from such an object point form at the entry aperture of the pairs of rotating wedges 4, 5 frusta of cones that run together or apart and having axes that do not extend parallel.

These cone axes are aligned parallel by means of the pairs of rotating wedges. In addition to this, as has already been stated in relation to FIGS. 2-4, a synchronous rotation of the pairs of wedges 4, 5 is undertaken. The result of this rotation is that the sum of the angles of the wedge surfaces in relation to the optical axis 101 of the lens systems 6, 7 is altered and a variable deflection is achieved thereby.

As a result of displacement of the lens groups 6a, 7a along the optical axis of the lens systems 6, 7, the light beams penetrating the pairs of rotating wedges 4, 5 are focused in the focal plane of the lens groups 6b, 7b so that the object site appears behind the lens systems 6, 7 at the same angle of view and can be seen stereoscopically. Without altering the position of the operating microscope, it is possible in this manner to select an individual object plane for the observation beam path 1.

It is, of course, within the scope of the invention if such focusing systems are additionally disposed also in the observation beam path 2. In this manner, the beam path 2 may also be independently focused, without in this case altering the position of the entire microscope in relation to the object.

If the intention is, in addition to the focusing plane, to select an individual magnification as well, then the lens systems 6, 7 and 15, 16, respectively, can be exchanged, for example, for the lens systems shown in FIG. 5 or FIGS. 6a-6c. According to FIG. 5, fixed alterations of the image magnification are selected, while in FIGS. 6a-6c a continuous displacement or alteration of the magnification is achieved. In this case, the lens 56, 57 (FIGS. 6a-6c) are displaced along axis 101 (FIG. 2). In order to carry out focusing, the lens 6a is disposed so as to be displaceable along axis 101. The displacement of the lens 6a is selected so that the set object plane is imaged by the lens 6a in a stationary position. As a result of this, the elements of a magnification changing device following lens 6a are independent of the focusing means.

It will be apparent to those skilled in the art that various modifications and variations can be made in the microscope of the present invention without departing from the scope or spirit of the present invention. Other embodiments of the invention will be apparent to those skilled in the art from consideration of the specification and practice of the invention disclosed herein. It is intended that the specification and examples be considered as exemplary only, and that the present invention cover the modifications and variations of this invention provided they come within a true scope and spirit of the appended claims and their equivalents.

What is claimed is:

1. A microscope comprising:
   a main objective lens having an optical axis;
   at least two mutually independent stereoscopic observation beam paths;
   a lens system disposed in each stereoscopic observation beam path in parallel with the optical axis of said main objective lens;
   said lens system having magnification means for selecting a magnification level;
   said magnification means including a first pair of lenses disposed below a second pair of lenses in overlapping configuration;
   at least one of said lens systems having focusing means for adjusting a focus plane of an object image;
   said focusing means including a first pair of overlapping, rotatable wedges disposed between a first lens of said first pair of lenses and said main objective lens and a second pair of overlapping, rotatable wedges disposed between a second lens of said first pair of lenses and said main objective lens,
   wherein said first and second pair of rotatable wedges are mechanically and adjustably associated with said first and second lenses of said first pair of lenses, respectively, for movement along and in parallel with said optical axis of said main objective lens for selecting a plane of focus of an object image.

2. The microscope as claimed in claim 1, wherein said first pair of lenses are movably and adjustably disposed above said main objective lens.

3. The microscope as claimed in claim 1, wherein said second pair of lenses are movably and adjustably disposed over said first pair of lenses.

4. The microscope as claimed in claim 1, wherein said first pair and second pair of lenses are both movably and adjustably disposed above said main objective lens.

5. The microscope as claimed in claim 1, further comprising a first pupil displacement system provided within at least a first stereoscopic observation beam path above said lens system.

6. The microscope as claimed in claim 5, wherein said pupil displacement system is provided with modular unit construction.

7. The microscope as claimed in claim 5, wherein said first pupil displacement system includes a deflecting prism.

8. The microscope as claimed in claim 5, further comprising a second pupil displacement system provided in a second stereoscopic observation beam path above said lens system.

9. The microscope as claimed in claim 8, wherein at least one of said pupil displacement systems is provided with modular unit construction.

10. The microscope as claimed in claim 8, wherein each pupil displacement system includes a deflecting prism.

11. The microscope as claimed in claim 8, wherein each pupil displacement system is provided in different lengths.

12. The microscope as claimed in claim 11, wherein each pupil displacement system includes prisms to effect equal optical path lengths in the pupil displacement systems.

13. The microscope as claimed in claim 11, wherein at least one pupil displacement system includes a folding prism and a pentaprism.

14. The microscope as claimed in claim 11, wherein at least one pupil displacement system includes a pentaprism, a plane parallel plate and a Bauernfeind prism.

15. The microscope as claimed in claim 8, wherein each pupil displacement system includes a pentaprism.

16. The microscope as claimed in claim 1, wherein each of said lens systems includes a continuous magnification unit having at least one axially displaceable lens.

17. The microscope as claimed in claim 1, wherein said main objective lens is exchangeably disposed on said microscope.

18. The microscope as claimed in claim 1, wherein said focusing means further includes a pair of lower and upper rotatable mounts for each pair of overlapping rotatable wedges;
    said upper rotatable mount having a wavy profile top rim;
    said lower rotatable mount and said upper rotatable mount being operatively engaged by a bevel gear for rotation in mutually opposite directions;
    said bevel gear being operatively associated with a rotary drive shaft;
    a mount movable along and in parallel with said optical axis of said main objective lens and disposed above said upper rotatable mount and holding a first lens of said first lens system; and
    a control element integral with said mount holding said first lens and operatively associated with the top rim of said upper rotatable mount, wherein
    said mount holding said first lens is operatively moved by rotation of said upper rotatable mount, and said upper rotatable mount is operatively rotated by rotation of said rotary drive shaft.

19. The microscope as claimed in claim 18, wherein said rotary drive shaft is operatively associated with a drive gear wheel.

20. The microscope as claimed in claim 19, wherein said drive gear wheel is operatively associated with a common drive gear wheel.

21. The microscope as claimed in claim 20, wherein said common drive gear wheel is operatively associated with a driver.

22. The microscope as claimed in claim 21, wherein said driver is a motor.

23. A microscope comprising:
    a main objective lens having an optical axis;
    at least two mutually independent stereoscopic observation beam paths;
    a lens system disposed in each stereoscopic observation beam path in parallel with the optical axis of said main objective lens;
    said lens system having magnification means for selecting a magnification level;
    said magnification means including a first pair of lenses disposed below a second pair of lenses in overlapping configuration;
    at least one of said lens systems having focusing means for adjusting a focus plane of an object image;
    said focusing means including a first pair of overlapping, rotatable wedges disposed between a first lens of said first pair of lenses and a first lens of said second pair of lenses and a second pair of overlapping, rotatable wedges disposed between a second lens of said first pair of lenses and a second lens of said second pair of lenses, wherein said first and second pair of rotatable wedges are mechanically and adjustably associated with said first and second lenses of said first pair of lenses, respectively, for movement along and in parallel with said optical axis of said main objective lens for selecting a plane of focus of an object image.

24. The microscope as claimed in claim 23, wherein said first pair of lenses are movably and adjustably disposed above said main objective lens.

25. The microscope as claimed in claim 23, wherein said second pair of lenses are movably and adjustably disposed above said first pair of lenses.

26. The microscope as claimed in claim 23, wherein said first pair and second pair of lenses are both movably and adjustably disposed above said main objective lens.

27. The microscope as claimed in claim 23, further comprising a first pupil displacement system provided within at least a first stereoscopic observation beam path above said lens system.

28. The microscope as claimed in claim 27, wherein at least one of said displacement systems is provided with modular unit construction.

29. The microscope as claimed in claim 27, wherein said first pupil displacement system includes a deflecting prism.

30. The microscope as claimed in claim 27, further comprising a second pupil displacement system provided in a second stereoscopic observation beam path above said lens system.

31. The microscope as claimed in claim 30, wherein said pupil displacement system is provided with modular unit construction.

32. The microscope as claimed in claim 30, wherein each pupil displacement system includes a deflecting prism.

33. The microscope as claimed in claim 30, wherein each pupil displacement system is provided in different lengths.

34. The microscope as claimed in claim 33, wherein each pupil displacement system includes prisms to effect equal optical path lengths in the pupil displacement systems.

35. The microscope as claimed in claim 33, wherein at least one pupil displacement system includes a folding prism and a pentaprism.

36. The microscope as claimed in claim 33, wherein at least one pupil displacement system includes a pentaprism, a plane parallel plate and a Bauernfeind prism.

37. The microscope as claimed in claim 30, wherein each pupil displacement system includes a pentaprism.

38. The microscope as claimed in claim 23, wherein each of said lens systems includes a continuous magnification unit having at least one axially displaceable lens.

39. The microscope as claimed in claim 23, wherein said main objective lens is exchangeably disposed on said microscope.

40. The microscope as claimed in claim 23, wherein said focusing means further includes a pair of lower and upper rotatable mounts for each pair of overlapping rotatable wedges;

said upper rotatable mount having a wavy profile top rim;

said lower rotatable mount and said upper rotatable mount being operatively engaged by a bevel gear for rotation in mutually opposite directions;

said bevel gear being operatively associated with a rotary drive shaft;

a mount movable along and in parallel with said optical axis of said main objective lens and disposed above said upper rotatable mount and holding a first lens of said first lens system; and a control element integral with said mount holding said first lens and operatively associated with the top rim of said upper rotatable mount, wherein said mount holding said first lens is operatively moved by rotation of said upper rotatable mount, and said upper rotatable mount is operatively rotated by rotation of said rotary drive shaft.

41. The microscope as claimed in claim 40, wherein said rotary drive shaft is operatively associated with a drive gear wheel.

42. The microscope as claimed in claim 41, wherein said drive gear wheel is operatively associated with a common drive gear wheel.

43. The microscope as claimed in claim 42, wherein said common drive gear wheel is operatively associated with a driver.

44. The microscope as claimed in claim 43, wherein said driver is a motor.

* * * * *